(12) United States Patent
Ichikawa

(10) Patent No.: US 6,786,956 B2
(45) Date of Patent: Sep. 7, 2004

(54) BALLPOINT PEN OIL-BASED INK COMPOSITION AND BALLPOINT PENS

(75) Inventor: Shuji Ichikawa, Shinagawa-ku (JP)

(73) Assignee: Mitsubishi Pencil Co., Ltd., Tokyo (JP)

( * ) Notice: Subject to any disclaimer, the term of this patent is extended or adjusted under 35 U.S.C. 154(b) by 0 days.

(21) Appl. No.: 10/026,799

(22) Filed: Dec. 27, 2001

(65) Prior Publication Data

US 2002/0139280 A1 Oct. 3, 2002

(30) Foreign Application Priority Data

Dec. 28, 2000 (JP) ......................................... 2000-403103

(51) Int. Cl.[7] .............................. C09D 11/16; B43K 7/03
(52) U.S. Cl. ............................... 106/31.43; 106/31.49; 106/31.58; 106/31.75; 106/31.78; 106/31.86; 401/209
(58) Field of Search ........................... 106/31.43, 31.49, 106/31.58, 31.75, 31.78, 31.86; 401/209

(56) References Cited

U.S. PATENT DOCUMENTS 5,785,746 A * 7/1998 Kito et al. ................ 106/31.86
5,911,815 A * 6/1999 Yamamoto et al. ....... 106/31.27
6,200,053 B1 * 3/2001 Asami et al. ................ 401/142
6,299,376 B1 * 10/2001 Nakatani ..................... 401/215
6,498,203 B1 * 12/2002 Kito et al. ................... 523/161
2003/0005854 A1 * 1/2003 Miyamoto et al. ........ 106/31.13
2003/0075074 A1 * 4/2003 Ichikawa et al. .......... 106/31.43

FOREIGN PATENT DOCUMENTS

| JP | 57-38629 | 8/1982 |
| JP | 61-52872 | 11/1986 |
| JP | 3-28279 | 2/1991 |
| JP | 6-247093 | 9/1994 |
| JP | 11-158421 | 6/1999 |

\* cited by examiner

*Primary Examiner*—Mark L. Bell
*Assistant Examiner*—Veronica F. Faison
(74) *Attorney, Agent, or Firm*—Foley & Lardner LLP

(57) ABSTRACT

A ballpoint pen oil-based ink composition, comprising an ink having therein a mixture of at least one phosphoric acid ester having an acid number of 90 to 600 and at least one weakly cationic component selected from the group consisting of:
  a) imidazoline-type activator,
  b) polyoxyethylene alkylamine,
  c) polyoxyethylene alkylamide, and
  d) alkylalkanolamide.

44 Claims, 1 Drawing Sheet

BALLPOINT PEN OIL-BASED INK COMPOSITION AND BALLPOINT PENS

BACKGROUND OF THE INVENTION

1. Field of the Invention

Figure 1:
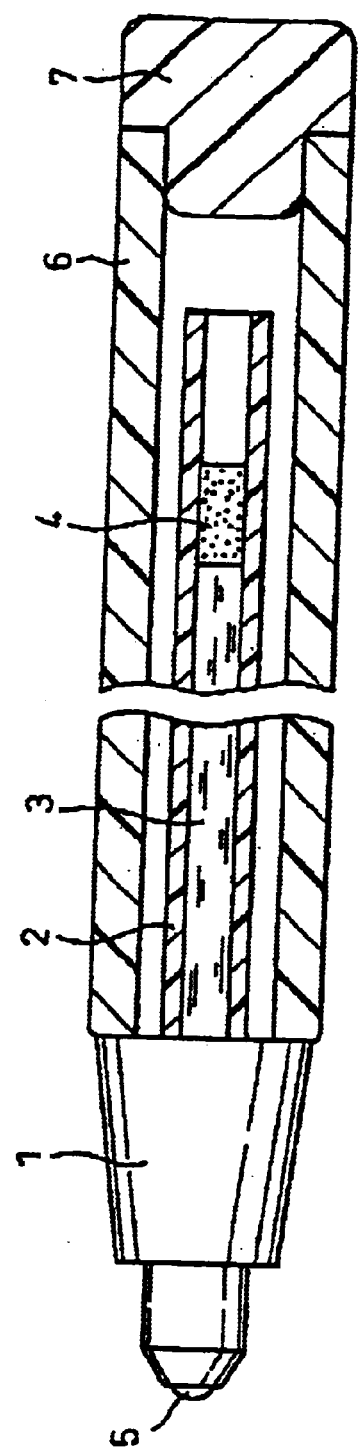

The present invention relates to a ballpoint pen oil-based ink composition, which is suitably used as a ballpoint pen oil-based ink, to prevent the written letters and the like from being blurred at the start of writing, provide soft writing and smooth feeling on writing, and allow the ink to quickly penetrate into the surface of a material written down on, and exhibits excellent drying property at the pen tip.

2. Background Art

Oil-based ballpoint pens are heretofore liable to suffer from a problem such that due to thickening of ink at the distal end of the ball chip resulting from evaporation of the solvent in ink, the ink is not easily ejected at the start of writing, or writing with sufficiently high density cannot be obtained until the ball starts fully rotating. This blur phenomenon greatly depends on the environmental conditions and often occurs under low-temperature or high-temperature conditions to cause unpleasantness. In the case of using a solvent having high volatility, this phenomenon occurs outstandingly and becomes a serious problem.

In order to solve this problem, various studies have been heretofore made. For example, Japanese Examined Patent Publication (Kokoku) No. 61-52872 discloses a technique of keeping the fluidity of ink by adding a specific nonionic surfactant, Japanese Examined Patent Publication (Kokoku) No. 57-38629 discloses a technique of using a high boiling point aromatic hydrocarbon as a solvent to prevent the ink from drying or absorbing moisture and thereby deteriorating, Japanese Unexamined Patent Publication (Kokai) No. 3-28279discloses a technique of keeping the fluidity of ink by adding a phosphoric acid ester, and Japanese unexamined Patent Publication No. 6-247093 discloses a technique of using a nonvolatile solvent to prevent the ink from completely drying out.

Japanese Unexamined Patent Publication (Kokai) No. 11-158421 discloses a technique where a salt of a basic dye with a phosphoric acid ester is blended to prevent the dye from crystallizing at the pen tip, as a result, the ink can be prevented from drying to solidify and can be obtained in the grease to paste state at the pen tip, so that the fluidity of ink can be maintained and writing can smoothly start, thereby overcoming the problem of blur. Also, Japanese Unexamined Patent Publication (Kokai) No. 11-21495 discloses a technique of neutralizing an acidic polyoxyethylene alkyl ether phosphate with a predetermined alkylalkanolamine or morpholine, where the same effect as above is obtained. However, the amine substance used here has strong odor and high reactivity and therefore, the latitude in selecting the solvent, dye and the like is liable to be narrow.

Although there arises no problem in the case of solvents having a vapor pressure of less than 0.01 mmHg used in conventional oily-based ballpoint pens, the solvent for use in the present invention has a high vapor pressure and when an ink agglomerate solidifies in the periphery of ball, an extremely large writing load is necessary on starting the writing by moving the ball.

SUMMARY OF THE INVENTION

The object of the present invention is to provide a ballpoint pen oil-based ink composition, which, unlike conventional techniques, renders the ball surface to be hardly wetted upon drying of the ink, facilitates the removal of dry agglomerate from the periphery of ball, prevents the blur of written letters and the like at the start of writing, and enables smooth start of writing. The object of the present invention includes providing an oil-based ballpoint pen using said oil-based ink composition.

In order to attain these objects, it has been found that the above-described problems can be solved by the ballpoint pen oil-based ink composition of the present invention, which is characterized by the following features. The present invention has been accomplished based on this finding, (1) A ballpoint pen oil-based ink composition, comprising a colorant, an oil-based solvent, at least one phosphoric acid ester having an acid value of 90 to 600, and at least one weakly cationic component selected from the group consisting of:
  a) imidazoline-type activator,
  b) polyoxyethylene alkylamine,
  c) polyoxyethylene alkylamide, and
  d) alkylalkanolamide.

(2) The ballpoint pen oil-based ink composition as in (1), wherein the polyoxyethylene alkylamine and polyoxyethylene alkylamide each has a polyoxyethylene addition molar number of 2 to 50 and the alkyl group in the amine or amide is derived from an acid or alcohol having from 10 to 30 carbon atoms.

(3) The ballpoint pen oil-based ink composition as in (1) and (2), wherein said solvent comprises at least a solvent selected from the group consisting of alcohols, polyhydric alcohols and glycol ethers each having a vapor pressure at 25° C. of 0.001 mmHg or more.

(4) The ballpoint pen oil-based ink composition as in (1) to (3), wherein said solvent comprises, as a main solvent, at least a solvent selected from the group consisting of alcohols, polyhydric alcohols and glycol ethers each having a vapor pressure at 25° C. of 0.01 mmHg or more.

(5) A ballpoint pen comprising an ink holder, the ballpoint pen oil-based ink composition as in (1) to (4) in said ink holder, and an ballpoint pen tip provided at an end of the ink holder.

(6) The ballpoint pen as in (5), further comprising an ink follower provided in said ink holder at another end of the ink composition opposite to the ballpoint pen tip.

(7) The ballpoint pen as in (5) or (6), wherein said ballpoint pen tip comprises a ceramic micro ball.

BRIEF DESCPIPTION OF THE DRAWING

FIG. 1 schematically shows a cross section of a non-limiting example of a ballpoint pen of the present invention wherein the referential number 1 stands for 1 a ball pen tip, 2 an ink holder or an ink storing pipe, 3 an ink, 4 an ink follower, 5 a micro ball, 6 a hollow bavel and 7 a tail plug.

DETAILED DESCRIPTION OF THE INVENTION

The phosphoric acid ester for use in the present invention usually comprises a phosphoric acid monoester, a phosphoric acid diester and a trace phosphoric acid triester. The ester structure is mainly a surfactant including two systems of aromatic and aliphatic, The structure is represented by the following formula:

Monoester
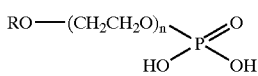

Diester
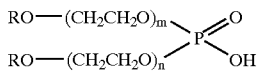

Triester
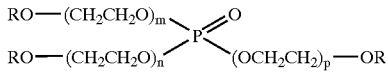

wherein
- n, m, p: each an average addition molar number (n, m, p ≧ 0, preferably 10 ≧ n, m ≧ 0, p ≧ 0) of ethylene oxide; and
- R; each independently an alkyl group or alkylphenol group having from 3 to 30, preferably from 10 to 20, carbon atoms.

With respect to the alkyl group which can form the phosphoric acid ester structure, an alkyl group obtained from a naturally occurring or synthetic higher alcohol is introduced. Among these phosphoric acid esters, a phosphoric acid ester capable of dissolving in an organic solvent used and having an acid value (pE: 9.5) in the range from 90 to 600 is most preferred Specific examples thereof include Phosphanol series such as RE-410, LE-500, RE-610, LE-700, RM-410, LM-400, LF200, LF205, RP-710, LP-700, RS-410, LS-500, RD-510Y, RB-410, LB-400, RA-600, GB-520, RD-720, ML-200 and ML-220, produced by Toho Chemical Industrial Co., Ltd., and additionally include PRISURF series such as A212E, A210G, AL, A212C, A215C, A208B, A206S and A208F, produced by Dai-ichi Kogyo Seiyaku Co., Ltd. Also, similar phosphoric acid esters are available from Asahi Denka Kogyo K.K. and the like.

The weakly cationic component for use in the present invention includes imidazoline-type activator, polyoxyethylene alkylamine, polyoxyethylene alkylamide and alkylalkanolamide, and is represented by the following formula:

Imidazoline-Type Surfactant

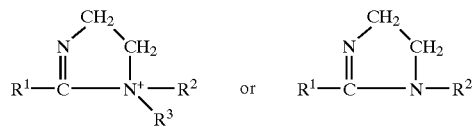

wherein
- $R^1$: H or an alkyl or alkylphenol group having from 1 to 30, preferably from 10 to 20, carbon atoms;
- $R^2$: a hydroxylalkyl group having from 1 to 30, preferably from 10 to 20, carbon atoms; and
- $R^3$: $CH_2COO^-$/carboxylate group.

The imidazoline-type surfactant includes the above two imidazolinium betaine-type amphoteric surfactants, imidazoline derivatives and the like (substances like amphoteric surfactant may show the properties of a weak base when mixed with an anionic surfactant such as phosphoric acid ester).

Specific examples thereof include 2-lauryl-N-carboxymethyl N-hydroxyethyl imidazolium betaine such as ANHITOL 20Y (produced by Kao Corporation), quaternized alkylimidazoline such as SOFNON (produced by Toho Chemical Industrial Co., Ltd.), alkylimidazoline such as TEXNOL IL55 (produced by Nippon Nyukazai Co., Ltd.), and imidazoline derivatives such as SUFRIC #512 (produced by Itoh Oil Chemicals Co., Ltd.) and SOFNON SSK-15 and NC-75 (produced by Toho Chemical Industrial Co., Ltd.).

Polyoxyethylene alkylamine

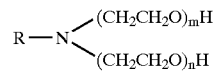

wherein
- R: H or an alkyl or alkylphenol group having from 1 to 30 carbon atoms; and
- n, m ≧ 1, preferably n, m ≧ 2, more preferably n, m ≧ 5.

The ethylene oxide (EO) addition molar number is more than 2, preferably more than 5, whereby the mixture with phosphoric acid ester can more stably keep the dissolving state in the ink. The upper limit of EO is preferably 50 or less.

Specific examples thereof include polyoxyethylene stearylamines such as TAMNS-5 (EO 5 mol adduct), TAMNS-10 (EO 10 mol adduct), TAMNS-15 (EO 15 mol adduct) (all produced by Nikko Chemicals K.K.), NYMEEN S-202, NYMEEN S-210, NYMEEN S-215 and NYMEEN S-250 (all produced by NOF Corporation), and polyoxyethylene oleylamines such as TAMNO-5 (EO 5 mol adduct), TAMNO-15 (EO 15 mol adduct) (both produced by Nikko Chemicals K.K.), NYMEEN O-202, NYMEEN O-205 and NYMEEN O-215 (produced by NOF Corporation). Other examples of polyoxyethylenealkylamine include AMIET 102, AMIET 105 and AMIET 320 (produced by Kao Corporation).

Polyoxyethylene alkylamine

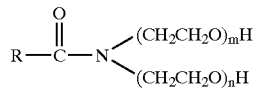

wherein
- R: H or an alkyl or alkylphenol group having from 1 to 30 carbon atoms; and
- n, m ≧ 1, preferably n, m ≧ 2, more preferably n, m ≧ 4.

Specific examples thereof include polyoxyethylene stearic acid amide such as TAMDS-4 (EO 4 mol adduct) and TAMDS-15 (EO 15 mol adduct) (produced by Nikko Chemicals K.K.), polyoxyethylene oleic acid amide such as TAMDO-5 (EO 5 mol adduct) (produced by Nikko Chemicals K.K.), NYMID MO-202, NYMID MO-204, NYMID MO-205, NYMID MO-206, NYMID MO-207 and NYMID MO-209, polyoxyethylene lauric acid amide such as NYMID L-203 and NYMID L-206 (produced by NOF Corporation), and polyoxyethylene ricinoleic acid amide such as NYMID R-207 (produced by NOF Corporation).

Alkylalkanolamide

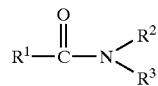

wherein
- $R^1$: an alkyl or alkylphenol group having from 1 to 30 carbon atoms, preferably from 10 to 20 carbon atoms;

R²: H or an alkyl or hydroxyalkyl group having from 1 to 30 carbon atoms, preferably from 10 to 20 carbon atoms; and R³: H or an alkyl or hydroxylalkyl group having from 1 to 30 carbon atoms, preferably from 10 to 20 carbon atoms.

Specific examples thereof include coconut oil fatty acid diethanolamide such as AMINON PK-02S (produced by Kao Corporation), lauric acid diethanolamide such as AMINON L-02 (produced by Kao Corporation) and STAHOME DL (produced by NOF Corporation), stearic acid diethanolamide such as STAHOME DS, stearic acid monoethanolamide such as STAHOME T, isostearic acid diethanolamide such as STAHOME DIS, oleic acid diethanolamide such as STAHOME DO and STAHOME DOS, myristic acid diethanolamide such as STAHOME DM, beef tallow fatty acid diethanolamide such as STAHOME DT, hydrogenated beef tallow fatty acid diethanolamide such as STAHOME DT, and palmitic acid ethanolamide (produced by NOF Corporation).

In addition, the amide-base component includes a combination of polyoxyethylene alkylamide and alkanolamide, and specific examples thereof include polyoxyethylene coconut oil fatty acid diethanolamide obtained such as NYMID F203 and NYMID F215 (produced by NOF Corporation), and polyoxyethylene coconut oil fatty acid monoethanol amide such as NYMID MF-203, NYMID F-206, NYMID F-210 and NYMID MF-210

These are a mixture of alkyl groups and therefore, the above-described range is that of the main alkyl group. Other than these, fatty amine-base substances such as primary amine and secondary amine derived from a fatty acid, and tertiary amine derived from higher alcohol, can also be used, though the effect thereof is low.

The amount of the phosphoric acid ester blended is from 0.1 to 15.0% by weight, preferably from 0.3 to 10.0% by weight, more preferably 0.5 to 7.0% by weight.

The weakly cationic component can be mixed within the range of not causing any adverse effect, however, those having an amine number can be neutralized using the following formula:

Amount of amine component (g/kg)=(Av×M)/(56.11×w)
wherein
AV: acid number of phosphoric acid ester
M: molecular weight of amine component used
W: valence number of amine component used Therefore, the amount added can be adjusted according to the use. The amount blended is suitably from 0.1 to 15.0% by weight, preferably from 0.3 to 10.0% by weight, more preferably from 0.5 to 7.0% by weight.

By blending as such a phosphoric acid ester having an acid number of 90 to 600 and a specific weakly cationic component in a ballpoint pen oil-based ink composition, an action of preventing drying and solidification at the pen tip can be obtained, because the phosphoric acid ester exhibits affinity for both the ball surface and the ink solvent or dye by virtue of its surface activity and at the same time, has lubricity originated in the organic group. However, the phosphoric acid ester has a strong surface activity and therefore, has a tendency of hardening the dried solid depending on the kind of the solvent. This tendency has a close relationship with the humidity and as the humidity is higher, the blur at the start of wiring is more serious. This seems to occur probably because when moisture is absorbed, the behavior of water within the dried solid comes to more firmly strengthen the bonding of the solid or adhesion to metal.

Accordingly, it may be considered that the bonding strength of the dried solid can be relaxed by blending a substance which, even when absorbs moisture, exhibits cationic behavior capable of relaxing the bonding strength of the phosphoric acid ester which is an anionic substance. However, among substances showing cationic behavior, a dye or pigment dispersion used in the ballpoint pen oil-based ink composition is greatly affected by amine. This is more outstanding particularly in the case of a dye, because the dye used is a salt formed from a basic component and an acidic component in many cases.

Therefore, a weakly cationic component is suitably used for relaxing the hardness of dried solid and for attaining stability and the like of the ink as a whole. Weakly cationic components except for the specific weakly cationic component of the present invention, and strongly cationic components greatly affect the solubility of starting materials other than the dye and therefore, use of these components must be avoided. According to the present invention, a mixture of a phosphoric acid ester and a specific weakly cationic component is blended and this blending is considered to bring improvement in the blur at the start of writing. In the case of using a highly volatile solvent as a solvent of the ink composition, the dried solid is particularly liable to harden and therefore, the addition of the weakly cationic component of the present invention is more effective.

The solvent for use in the composition of the present invention is preferably a solvent selected from alcohols, polyhydric alcohols and glycol ethers.

Specific examples of the alcohols include aliphatic alcohols having 2 or more carbon atoms, such as ethanol, n-propanol, isopropanol, n-butanol, isobutanol, tert-butyl alcohol, 1-pentanol, isoamyl alcohol, sec-amyl alcohol, 3-pentanol, tert-amyl alcohol, n-hexanol, methylamyl alcohol, 2-ethyl butanol, n-heptanol, 2-heptanol, 3-heptanol, n-octanol, 2-octanol, 2-ethyl hexanol, 3,5,5-trimethyl hexanol, nonanol, n-decanol, undecanol, trimethylnonyl alcohol, tetradecanol, heptadecanol, cyclohexanol, 2-methylcyclohexanol, benzyl alcohol and other various higher alcohols.

Specific examples of the polyhydric alcohols include polyhydric alcohols having 2 or more carbon atoms and 2 or more hydroxyl groups within the molecule, such as ethylene glycol, diethylene glycol, 3-methyl-1,3-butanediol, triethylene glycol, dipropylene glycol, 1,3-propanediol 1,3-butanediol, 1,5-pentanediol, hexylene glycol and octylene glycol.

Specific examples of the glycol ether include methylisopropyl ether, ethyl ether, ethylpropyl ether, ethylbutyl ether, isopropyl ether, butyl ether, hexyl ether, 2-ethylhexyl ether, ethylene glycol monohexyl ether, ethylene glycol monophenyl ether, ethylene glycol mono-2-ethylbutyl ether, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol monobutyl ether, tetraethylene glycol monobutyl ether, 3-methyl-3-methoxy-1-butanol, 3-methoxy-1-butanol, propylene glycol monomethyl ether, propylene glycol monoethyl ether, propylene glycol monopropyl ether, propylene glycol monobutyl ether, propylene glycol phenyl ether, propylene glycol tertiary butyl ether, dipropylene glycol monomethyl ether, dipropylene glycol monoethyl ether, dipropylene glycol monopropyl ether, dipropylene glycol monobutyl ether, tripropylene glycol monomethyl ether, tripropylene glycol monobutyl ether and tetrapropylene glycol monobutyl ether.

Among these solvents, preferred are glycol ethers having from 2 to 7 carbon atoms because of their clear effect. In view of safety, peroral toxicity or the like, an organic solvent other than ethylene glycol derivatives is preferably used.

As described above, the present invention is particularly effective in the case of using a solvent having high volatility and the volatility thereof is, in terms of a vapor pressure at 25° C., 0.001 mmHg or more, preferably 0.01 mmHg or more.

In the ink composition of the present invention, it is particularly effective to use the solvents shown below, which are previously disclosed by the present applicant.

(1) A ballpoint pen oil-based ink composition, characterized in that a solvent having a chemical structural formula $C_nH_{2n+1}OC_3H_6OH$ (wherein n is an integer of 1 to 3) is contained as a main solvent, an auxiliary solvent having a vapor pressure lower than that of the main solvent and having a viscosity of 1 to 50 mPa·s is contained, a resin soluble at least in either one of the main solvent and the auxiliary solvent is further contained, and the ink viscosity is from 800 to 10,000 mPa·s at 25° C. (Japanese Unexamined Patent Publication (Kokai) No. 2001-152069).

(2) A ballpoint pen oil-based ink; composition, characterized in that a propylene glycol monomethyl ether and one or more compounds having the following chemical structural formula:

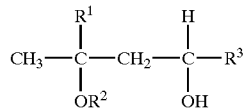

wherein $R^1$, $R^2$ and $R^3$ each is independently H or $CH_3$) are contained as a main solvent, a resin soluble in this mixed solvent is contained, and the ink viscosity is from 800 to 6,000 mpa·s at 25° C. (Japanese Patent Application No. 2000-105414).

(3) A ballpoint pen oil-based ink composition, characterized in that one or more solvent having the following chemical structural formula:

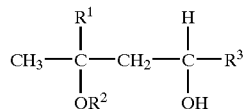

(wherein $R^1$, $R^2$ and $R^3$ each is independently H or $CH_3$) is contained as a main solvent, a resin soluble in this mixed solvent is further contained, and the ink viscosity is from 700 to 8,000 mPa·s at 25° C. (Japanese Patent Application No. 2000-232004).

In addition to these solvents, a solvent shown below can also be added within the range of not hindering the solubility or volatility of the phosphoric acid ester and the imidazoline-type activator or polyoxyethylene alkylamine.

Examples thereof include polyhydric alcohol derivatives, sorbitan fatty acid derivatives, polyglycerin higher fatty acid derivatives, sucrose fatty acid derivatives and propylene glycol fatty acid derivatives.

Examples of esters as the solvent include various esters such as propylene glycol methyl ether acetate, propylene glycol diacetate, 3-methyl-3-methoxybutyl acetate, propylene glycol ethyl ether acetate, ethylene glycol ethyl ether acetate, butyl formate, isobutyl formate, isoamyl formate, propyl acetate, butyl acetate, isopropyl acetate, isobutyl acetate, isoamyl acetate, methyl propionate, ethyl propionate, propyl propionate, isobutyl propionate, isoamyl propionate, methyl butyrate, ethyl butyrate, propyl butyrate, methyl isobutyrate, ethyl isobutyrate, propyl isobutyrate, methyl valerate, ethyl valerate, propyl valerate, methyl isovalerate, ethyl isovalerate, propyl isovalerate, methyl trimethylacetate, ethyl trimethylacetate, propyl trimethylacetate, methyl caproate, ethyl caproate, propyl caproate, methyl caprylate, ethyl caprylate, propyl caprylate, methyl laurate, ethyl laurate, methyl oleate, ethyl oleate, caprylic acid triglyceride, citric acid tributylacetate, octyl oxystearate, propylene glycol monoricinolate, methyl 2-hydroxyisobutyrate and 3-methoxybutyl acetate.

Specific examples of the diether or diester as a solvent having no hydroxyl group within the molecule include ethylene glycol diethyl ether, ethylene glycol dibutyl ether, diethylene glycol diethyl ether, diethylene glycol dibutyl ether, diethylene glycol dimethyl ether and dipropylene glycol dimethyl ether.

Examples of the resin for use in the ballpoint pen oil-based ink composition of the present invention include resins represented by ketone resin, styrene resin, styrene-acrylic resin, terpene phenol resin, rosin-modified maleic acid resin, rosin phenol resin, alkylphenol resin, phenol-based resin, styrene maleic acid resin, rosin-based resin, acryl-based rein, urea aldehyde-based resin, maleic acid-based resin, cyclohexanone-based resin, polyvinyl butyral and polyvinyl pyrrolidone.

The amount of this resin blended is preferably from 1 to 30% by weight, more preferably from 1 to 20%. If the amount blended is less than 1%, there arises difficulty in the control of viscosity ox in the abrasion at the pen tip, whereas if it exceeds 30%, the starting materials other than the resin may not be blended or the writing is adversely affected.

In the case of using a pigment as a coloring material for the ink composition of the present invention, a resin capable of dispersing the pigment may be selected from the above-described resins and used as the dispersant. The dispersant is not limited on the kind thereof and any may be used, irrespective of activator or oligomer, insofar as it can satisfy the purpose. Specific examples of the dispersant include synthetic resins such as polyvinyl alcohol, polyvinyl pyrrolidone, polyvinyl butyral, polyvinyl ether, styrene-maleic acid copolymer, ketone resin, hydroxyethyl cellulose and derivatives thereof, and styrene-acrylic acid copolymer, PO·EO adducts, and amine-base oligomers of polyester.

The coloring agent for use in the ballpoint pen oil-based ink of the present invention may be a dye or a pigment. The dye may be freely selected from the dyes used in normal dye ink compositions, such as direct dye, acid dye, basic dye, mordant acidic mordant dye, spirit-soluble dye, azoic dye, sulfur dye sulfur vat dye, vat dye, disperse dye, oil-soluble dye, food dye and metal complex dye, and inorganic pigments and organic pigments used in normal pigment ink compositions. The amount of the coloring agent blended is from 1 to 50% by weight based on the entire amount of the composition.

The pigment is preferably a pigment difficult in being dissolved in the organic solvent used and having an average particle size of 30 to 700 mm after the dispersion. The pigment can be blended in the range from 0.5 to 25% by weight, preferably from 0.5 to 20% by weight, if desired, based on the entire amount of the ink composition.

The pigments which can be used in the present invention may be used individually or in combination of two or more thereof. If desired, a dispersion using an inorganic pigment, a dye or the like may also be added within the range of not adversely affecting the dispersion stability. Other examples include resin emulsions obtained by polymerizing styrene, acrylic acid, acrylic acid ester, methacrylic acid, methacrylic acid ester, acrylonitrile or olefin-base monomer; hollow resin emulsions which swell in the ink to become amorphous; and organic multicolor pigments comprising dyed resin particles obtained by dyeing the above-described emulsion itself with a coloring agent.

In the case where the coloring material used in the present invention is a pigment, conventionally known various methods can be used to produce an ink composition having dispersed therein a pigment. For example, respective components described above are, after blending, mixed and stirred by a stirrer such as dissolver, or mixed and pulverized by a ball mill, a roll mill, a bead mill, a sand mill, a pin mill or the like, and then the mixture is centrifuged or filtered to remove coarse pigment particles, non-dissolved materials and mingled solids, whereby an ink composition having dispersed therein a pigment can be easily obtained.

In the present invention, if desired, a rust preventive, an antifungal, a surfactant, a lubricant, a wetting agent and the like, which are compatibile without adversely affecting the ink, can be further blended. In particular, a fatty acid can be suitably used as a lubricant. Also, a non-volatile solvent or the like compatible with the main solvent can be blended as an additive for preventing drying, within the range of not causing any adverse effect in view of the product properties.

In the case of using the ink composition of the present invention in a ballpoint pen, an ink follower is preferably imparted to the rear end of the ballpoint pen. Since the solvent used is volatile, the ink follower is provided for preventing volatilization, moisture absorption and ink leakage.

The ink follower must exhibit a low permeability and a low diffusibility to a solvent used for the ink and a base material thereof may be a non-volatile or sparingly volatile fluid body, more specifically, non-silicon-base oils and fats fundamentally incompatible with a highly volatile solvent, such as polybutene and liquid paraffin, may be used. In the case where such a substance has a low viscosity, a thickener or a gelling agent may be used. Specific examples thereof include metal soaps, bentonites, fatty acid amides, hydrogenated castor oils, metal fine particles containing titanium oxide, silica, alumina or the like, celluloses, and elastomers.

In the case of using the ink composition of the present invention in a ballpoint pen, even a metal ball usually used can be used, however, when a ceramic-made ball is used, the blur phenomenon at the start of writing can be more suppressed. Furthermore, a ball having a small surface roughness and capable of controlling the wetting of ink, such as ceramics ball, is preferred. Insofar as this specification is satisfied, a metal ball may be used but a ceramic ball is preferred among balls commercially available at present.

The reason why the ceramic ball has an effect on the blur phenomenon at the start of writing is considered because in case of a ceramic ball, the ball has a surface state intensified in the property of repelling an ink and therefore, a dried solid resulting from coagulation and adherence of ink in the periphery of the ball and the caulking part at the distal end of the chip is not easily generated. From this reason, a dried solid which is generated in the periphery of a ball and a caulking part in the case of an ink using a high volatility solvent can be particularly reduced.

According to the present invention, an ink composition for ballpoint pens is provided, which, unlike conventional techniques, renders the ball surface to be hardly wetted on drying of the ink, facilitates the removal of dry agglomerate in the periphery of ball, prevents the blur of letters and the like at the start of writing, and enables smooth start of writing.

EXAMPLES

The present invention is described in greater detail below by referring to Examples, however, the present invention is not limited to these Examples.

In the preparation of ink, a mixed solution of a phosphoric acid ester and a weakly cationic component was prepared and used in the range from 5 to 20% by weight.

In this solution, from 95 to 80% by weight of a previously prepared high-concentration solution of ink for the evaluation of blur at the start of writing was mixed and stirred, thereby completing the ink.

| Mixed Solution of Phosphoric Acid Ester and Weakly Cationic Component | |
|---|---|
| 1) Phosphoric acid ester: LB-400 | 40% |
| Weakly cationic component: polyoxyethylene coconut oil alkylamine | 20% |
| 3-Methoxy butanol | 40% |
| 2) Phosphoric acid ester: PRIFSURF A208B | 40% |
| Weakly cationic component: polyoxyethylene (5) oleylamine | 30% |
| 3-Methoxy butanol | 30% |
| 3) Phosphoric acid ester: PRIFSURF A208S | 40% |
| Weakly cationic component: polyoxyethylene alkylamine | 30% |
| 3-Methoxy butanol | 30% |
| 4) Phosphoric acid ester: LS-500 | 40% |
| Weakly cationic component: lauryl hydroxyethyl imidazoline | 40% |
| 3-Methoxy butanol | 20% |
| 5) Phosphoric acid ester: ML-200 | 40% |
| Weakly cationic component: polyoxyethylene (15) oleylamine | 35% |
| 3-Methoxy butanol | 25% |
| 6) Phosphoric acid ester: ML-220 | 40% |
| Weakly cationic component: polyoxyethylene (5) oleic acid amide | 30% |
| 3-Methoxy butanol | 30% |
| 7) Phosphoric acid ester: ML-220 | 40% |
| Weakly cationic component: alkylalkanolamide AMINONE L-02 (produced by Kao Corporation) | 30% |
| 3-Methoxy butanol | 30% |
| 8) Phosphoric acid ester: LB-400 | 40% |
| 3-Methoxy butanol | 60% |
| 9) Phosphoric acid ester: PRIFSURF A208S | 40% |
| 3-Methoxy butanol | 60% |
| 10) Weakly cationic component: lauryl hydroxyethyl imidazoline | 40% |
| 3-Methoxy butanol | 60% |
| 11) Phosphoric acid ester: PRIFSURF A217E (acid number: 45 to 58) | 40% |
| Weakly cationic component: polyoxyethylene coconut oil alkylamine | 20% |
| 3-Methoxy butanol | 40% |
| 12) Phosphoric acid ester: PRIFSURF A208B | 40% |
| Amine-base compound: triethanolamine | 30% |
| 3-Methoxy butanol | 30% |

| Preparation of High-Concentration Solution of Ink for Evaluation of Blur at the Start of Writing | |
|---|---|
| (High-Concentration Ink Solution 1 for Evaluation) | |
| SPIRON Black GMH Special [produced by Hodogaya Chemical Co., Ltd.] | 5% |
| BARIFAST Violet #1702 [produced by Orient Kagaku Kogyou K.K.] | 20% |
| Polyvinyl butyral BM-1 [produced by Sekisui Chemical Co., Ltd.] | 5% |

-continued

| Preparation of High-Concentration Solution of Ink for Evaluation of Blur at the Start of Writing | |
|---|---|
| YP90L [produced by Yasuhara Chemical K.K.] | 10% |
| 3-Methoxy butanol | 35% |
| 3-Methoxy-3-methyl butanol | 25% |
| (High-Concentration Ink Solution 2 for Evaluation) | |
| BARIFAST Violet #1702 [produced by Orient Kagaku Kogyou K.K.] | 25% |
| Polyvinyl butyral BM-1 [produced by Sekisui Chemical Co., Ltd.] | 6% |
| HIRACK 110H [produced by Hitachi Chemical Co., Ltd.] | 3% |
| 3-Methoxy butanol | 36% |
| 3-Methoxy-3-methyl butanol | 30% |

(Examples 1 to 14 and Comparative Examples 1 to 10)

The ink compositions prepared in Examples 1 to 14 and Comparative Examples 1 to 10 were as shown below.

| Example | 1 | 2 | 3 | 4 | 5 | 6 | 7 |
|---|---|---|---|---|---|---|---|
| High-Concentration Ink Solution 1 for evaluation | 90% | 90% | 85% | 85% | 95% | 95% | 95% |
| Mixed solution of phosphoric acid ester and weakly cationic component | 10% | 10% | 15% | 15% | 5% | 5% | 5% |
| | 8 | 9 | 10 | 11 | 12 | 13 | 14 |
| High-Concentration Ink Solution 2 for evaluation | 90% | 90% | 85% | 85% | 95% | 95% | 95% |
| Mixed solution of phosphoric acid ester and weakly cationic component | 10% | 10% | 15% | 15% | 5% | 5% | 5% |

| Comparative Example | 1 | 2 | 3 | 4 | 5 |
|---|---|---|---|---|---|
| High-Concentration Ink Solution 1 for evaluation | 90% | 90% | 85% | 95% | 85% |
| Mixed solution of phosphoric acid ester and weakly cationic component | 10% | 10% | 15% | 5% | 15% |
| | 6 | 7 | 8 | 9 | 10 |
| High-Concentration Ink Solution 2 for evaluation | 90% | 90% | 85% | 95% | 85% |
| Mixed solution of phosphoric acid ester and weakly cationic component | 10% | 10% | 15% | 5% | 15% |

Each ink obtained in Examples and Comparative Examples was filled and subjected to the following evaluation tests.

The ballpoint pen used in the test had a polypropylene tube with an inside diameter of 1.60 mm and a stainless chip (the ball was made of a hard metal and had a diameter of 1.0 mm). 30 Minutes after the filling, the following evaluations was performed under conditions of 25° C. and 65%.

1) Evaluation of Blur at the Start of Writing (sensory evaluation):

A letter of "三菱" was written and the evaluation was judged by the blur degree of the letter.

◉: Almost no blur (first or second line of "三" and the following could be written)

○: Slight blur (second line of "三" was slightly blurred but the following could be written without blur)

Δ: Slightly heavy blur (no blur after "菱")

×: Very heavy blur (writing of "菱" could not be completed)

2) Evaluation of Blur at the Start of writing (mechanical evaluation):

Under the conditions of 25° C. and 65%, a pen was set at 60° and a load of 200 g was applied thereon, The paper contacting therewith was moved at a rate of 2 m/min and the line drawn was observed. At this time, the distance of the line drawn from the starting point was measured. Five pens were prepared and an average value thereof was used for the measured value.

| | |
|---|---|
| Measured value ≦ 10 mm: | ◉ |
| 10 mm < Measured value ≦ 50 mm: | ○ |
| 50 mm < Measured value ≦ 100 mm: | Δ |
| 100 mm < Measured value: | × |

| (Evaluation Results) | | | | | | | | | | | | | | |
|---|---|---|---|---|---|---|---|---|---|---|---|---|---|---|
| Evaluation of Blur at the | Examples | | | | | | | | | | | | | |
| Start of writing | 1 | 2 | 3 | 4 | 5 | 6 | 7 | 8 | 9 | 10 | 11 | 12 | 13 | 14 |
| 1) Sensory evaluation | ○ | ◉ | ○ | ○ | ◉ | ◉ | ◉ | ○ | ◉ | ○ | ◉ | ◉ | ◉ | ◉ |
| 2) Mechanical evaluation | ◉ | ◉ | ○ | ◉ | ◉ | ○ | ◉ | ◉ | ◉ | ○ | ◉ | ◉ | ◉ | ◉ |

| Evaluation of Blur at the | Comparative Examples | | | | | | | | | |
|---|---|---|---|---|---|---|---|---|---|---|
| Start of Writing | 1 | 2 | 3 | 4 | 5 | 6 | 7 | 8 | 9 | 10 |
| 1) Sensory evaluation | Δ | X | X | X | X | Δ | X | X | Δ | X |
| 2) Mechanical evaluation | X | X | X | X | X | Δ | X | X | X | X |

As is apparent from the results shown above, the ink compositions of Examples 1 to 14 within the scope of the present invention are revealed to have a very excellent effect on the blur at the start of writing as compared with the ink compositions of Comparative Examples 1 to 10 which are out of the scope of the present invention.

I claim:

1. A ballpoint pen oil-based ink composition, comprising a coloring material,
an oil-based solvent, said oil-based solvent comprising one or more compounds having the following formula:

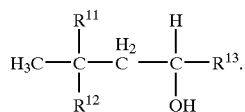

where $R^{11}$ and $R^{13}$ each is independently H or $CH_3$, $R^{12}$ is $CH_3$,
a polyvinyl butyral resin,
at least one phosphoric acid ester having an acid value of 90 to 600, and
at least one weak cationic component selected from the group consisting of:
 a) imidazoline activator,
 b) polyoxyethylene alkylamine,
 c) polyoxyethylene alkylamide, and
 d) alkylalkanolamide.

2. The ballpoint pen oil—based ink composition according to claim 1, wherein said phosphoric acid ester comprises a phosphoric acid monoester, a phosphoric acid diester, a phosphoric triester or a mixture thereof, said phosphoric acid monoester, phosphoric acid diester and triester being represented by the following formula:

Monoester
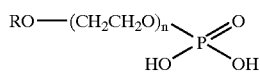
Diester
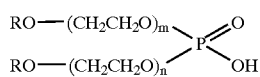
Triester
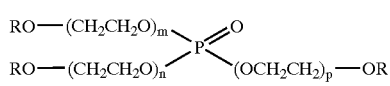

wherein
n, m, and p each have an average addition molar number of n, m, and p≧0 of ethylene oxide, and
R is independently an alkyl group or alkylphenol group having from 3 to 30 carbon atoms.

3. The ballpoint pen oil—based ink composition according to claim 1, wherein said imidazoline activator has a structure represented by the following formula or an imidazoline derivative:

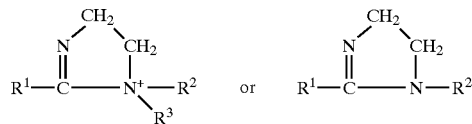

wherein
$R^1$ is H or an alkyl or alkylphenol group having from 1 to 30 carbon atoms;
$R^2$ is a hydroxylalkyl group having from 1 to 30 carbon atoms; and
$R^3$ is a $CH_2COO^-$/carboxylate group.

4. The ballpoint pen oil—based ink composition according to claim 1, wherein said polyoxyethylene alkylamine has a structure represented by the following formula:

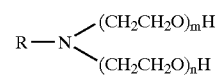

wherein
R is H or an alkyl or alkylphenol group having from 1 to 30 carbon atoms; and
n and m≧1.

5. The ballpoint pen oil-based ink composition according to claim 1, wherein said polyoxyethylene alkylamide has a structure represented by the following formula:

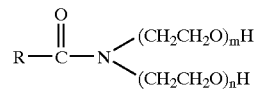

wherein
R is H or an alkyl or alkylphenol group having from 1 to 30 carbon atoms; and
n and m≧1.

6. The ballpoint pen oil-based ink composition according to claim 1, wherein said alkylalkanolamide has a structure represented by the following formula:

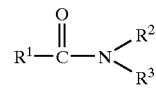

wherein
$R^1$ is an alkyl or alkylphenol group having from 1 to 30 carbon atoms;
$R^2$ is H or an alkyl or hydroxyalkyl group having from 1 to 30 carbon atoms; and
$R^3$ is H or an alkyl or hydroxylalkyl group having from 1 to 30 carbon atoms.

7. The ballpoint pen oil—based ink composition according to claim 1, wherein said phosphoric acid ester is contained in an amount of 0.1 to 15.0% by weight of the composition.

8. The ballpoint pen oil—based ink composition according to claim 1, wherein said weak cationic component is contained in an amount of 0.1 to 15.0% by weight of the composition.

9. The ballpoint pen oil—based ink composition according to claim 1, wherein said oil-based solvent comprises as a main solvent, at least one solvent selected from the group consisting of alcohols, polyhydric alcohols and glycol ethers each having a vapor pressure at 25° C. of 0.001 mmHg or more.

10. The ballpoint pen oil-based ink composition according to claim 1, wherein said oil-based solvent comprises as a main solvent, at least one solvent selected from the group consisting of alcohols, polyhydric alcohols and glycol ethers each having a vapor pressure at 25° C. of 0.01 mmHg or more.

11. The ballpoint pen oil-based ink composition according to claim 1, further comprising a resin in an amount of 1 to 30% by weight of the composition.

12. The ballpoint pen oil-based ink composition according to claim 1, wherein said oil-based solvent comprises a solvent having a chemical structure represented by $C_nH_{2n+1}OC_3H_6OH$ where n is an integer of 1 to 3 as a main solvent and an auxiliary solvent having a vapor pressure lower than that of said main solvent and having a viscosity of 1 to 50 mPa·s, said ink composition further comprises a resin soluble in at least one of said main and auxiliary solvents, said ink composition having a viscosity of 800 to 10,000 mPa·s at 25° C.

13. The ballpoint pen oil-based ink composition according to claim 1, wherein said oil—based solvent comprises a propylene glycol monoethyl ether
said ink composition further comprises a resin soluble in said mixed solvent, said ink composition having a viscosity of 800 to 6,000 mPa·s at 25° C.

14. The ballpoint pen oil—based ink composition according to claim 1, wherein
said ink composition further comprises a resin soluble in said solvent, said ink composition having a viscosity of 700 to 8,000 mPa·s at 25° C.

15. A ballpoint pen comprising an ink holder, a ballpoint pen oil—based ink composition in said ink holder, and an ballpoint pen tip provided at an end of the ink holder, wherein the ballpoint pen oil—based ink composition comprises
a coloring material,
an oil-based solvent, said oil-based solvent comprising one or more compounds having the following formula:

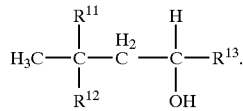

where $R^{11}$ and $R^{13}$ each is independently H or $CH_3$, $R^{12}$ is $CH_3$,
a polyvinyl butyral resin,
at least one phosphoric acid ester having an acid value of 90 to 600, and
at least one weak cationic component selected from the group consisting of:
a) imidazoline activator,
b) polyoxyethylene alkylamine,
c) polyoxyethylene alkylamide, and
d) alkylalkanolamide.

16. The ballpoint pen according to claim 15, further comprising an ink follower provided in said ink holder at another end of the ink composition opposite to the ballpoint pen tip.

17. The ballpoint pen according to claim 15, wherein said ballpoint pen tip comprises a ceramic micro ball.

18. The ballpoint pen oil—based ink composition according to claim 2, wherein n, m, and p are $10 \geq n$, $m \geq 0$, $p \geq 0$ and R is 10 to 20 carbon atoms.

19. The ballpoint pen oil—based ink composition according to claim 3, wherein $R^1$ of the imidazoline derivative is from 10 to 20 carbon atoms; and
$R^2$ of the imidazoline derivative is from 10 to 20 carbon atoms.

20. The ballpoint pen oil—based ink composition according to claim 4, wherein n and $m \geq 2$.

21. The ballpoint pen oil—based ink composition according to claim 4, wherein n and $m \geq 5$.

22. The ballpoint pen oil—based ink composition according to claim 5, wherein n and $m \geq 2$.

23. The ballpoint pen oil—based ink composition according to claim 5, wherein n and $m \geq 4$.

24. The ballpoint pen oil—based ink composition according to claim 6, wherein
$R^1$ is from 10 to 20 carbon atoms;
$R^2$ is from 10 to 20 carbon atoms; and
$R^3$ is from 10 to 20 carbon atoms.

25. The ballpoint pen according to claim 15, wherein said phosphoric acid ester comprises a phosphoric acid monoester, a phosphoric acid diester, a phosphoric triester or a mixture thereof, said phosphoric acid monoester, phosphoric acid diester and triester being represented by the following formula:

Monoester

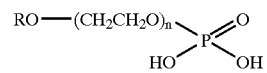

Diester

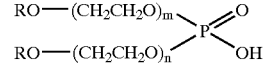

Triester

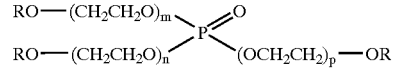

wherein
n, m, and p each have an average addition molar number of n, m, and $p \geq 0$ of ethylene oxide, and
R is independently an alkyl group or alkylphenol group having from 3 to 30 carbon atoms.

26. The ballpoint pen according to claim 15, wherein said imidazoline activator has a structure represented by the following formula or an imidazoline derivative:

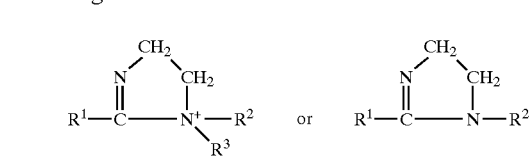

wherein
$R^1$ is H or an alkyl or alkylphenol group having from 1 to 30 carbon atoms;
$R^2$ is a hydroxylalkyl group having from 1 to 30 carbon atoms; and
$R^3$ is a $CH_2COO^-$/carboxylate group.

27. The ballpoint pen according to claim 15, wherein said polyoxyethylene alkylamine has a structure represented by the following formula:

$$R-N\begin{matrix}(CH_2CH_2O)_mH\\(CH_2CH_2O)_nH\end{matrix}$$

wherein

R is H or an alkyl or alkylphenol group having from 1 to 30 carbon atoms; and n and m≧1.

28. The ballpoint pen according to claim 15, wherein said polyoxyethylene alkylamide has a structure represented by the following formula:

$$R-\overset{\overset{O}{\|}}{C}-N\begin{matrix}(CH_2CH_2O)_mH\\(CH_2CH_2O)_nH\end{matrix}$$

wherein

R is H or an alkyl or alkylphenol group having from 1 to 30 carbon atoms; and n and m≧1.

29. The ballpoint pen according to claim 15, wherein said alkylalkanolamide has a structure represented by the following formula:

$$R^1-\overset{\overset{O}{\|}}{C}-N\begin{matrix}R^2\\R^3\end{matrix}$$

wherein $R^1$ is an alkyl or alkylphenol group having from 1 to 30 carbon atoms;

$R^2$ is H or an alkyl or hydroxyalkyl group having from 1 to 30 carbon atoms; and $R^3$ is H or an alkyl or hydroxylalkyl group having from 1 to 30 carbon atoms.

30. The ballpoint pen according to claim 15, wherein said phosphoric acid ester is contained in an amount of 0.1 to 15.0% by weight of the composition.

31. The ballpoint pen according to claim 15, wherein said weak cationic component is contained in an amount of 0.1 to 15.0% by weight of the composition.

32. The ballpoint according to claim 15, wherein said oil-based solvent comprises as a main solvent, at least one solvent selected from the group consisting of alcohols, polyhydric alcohols and glycol ethers each having a vapor pressure at 25° C. of 0.001 mmHg or more.

33. The ballpoint according to claim 15, wherein said oil-based solvent comprises as a main solvent, at least one solvent selected from the group consisting of alcohols, polyhydric alcohols and glycol ethers each having a vapor pressure at 25° C. of 0.01 mmHg or more.

34. The ballpoint pen according to claim 15, further comprising a resin in an amount of 1 to 30% by weight of the composition.

35. The ballpoint pen according to claim 15, wherein said oil-based solvent comprises a solvent having a chemical structure represented by $C_nH_{2n+1}OC_3H_6OH$ where n is an integer of 1 to 3 as a main solvent and an auxiliary solvent having a vapor pressure lower than that of said main solvent and having a viscosity of 1 to 50 mPa·s, said ink composition further comprises a resin soluble in at least one of said main and auxiliary solvents, said ink composition having a viscosity of 800 to 10,000 mPa·s at 25° C.

36. The ballpoint according to claim 15, wherein said oil—based solvent comprises a propylene glycol monoethyl ether said ink composition further comprises a resin soluble in said mixed solvent, said ink composition having a viscosity of 800 to 6,000 mPa·s at 25° C.

37. The ballpoint pen according to claim 15, wherein said ink composition further comprises a resin soluble in said solvent, said ink composition having a viscosity of 700 to 8,000 mPa·s at 25° C.

38. The ballpoint pen according to claim 26, wherein n, m, and p are 10≧n, m≧0, p≧0 and R is 10 to 20 carbon atoms.

39. The ballpoint pen according to claim 27, wherein $R^1$ of the imidazoline derivative is from 10 to 20 carbon atoms; and $R^2$ of the imidazoline derivative is from 10 to 20 carbon atoms.

40. The ballpoint pen according to claim 28, wherein n and m≧2.

41. The ballpoint pen according to claim 28, wherein n and m≧5.

42. The ballpoint pen according to claim 29, wherein n and m≧2.

43. The ballpoint pen according to claim 29, wherein n and m≧4.

44. The ballpoint pen according to claim 30, wherein $R^1$ is from 10 to 20 carbon atoms;

$R^2$ is from 10 to 20 carbon atoms; and $R^3$ is from 10 to 20 carbon atoms.

* * * * *